March 2, 1926.
C. BISHOP
1,575,093
WEEDER FOR CULTIVATORS
Filed Jan. 6, 1923
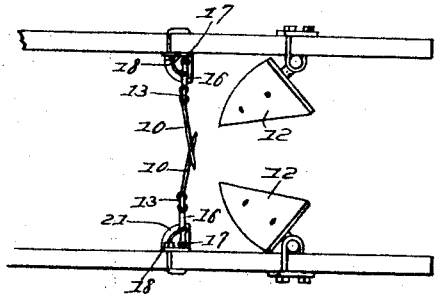
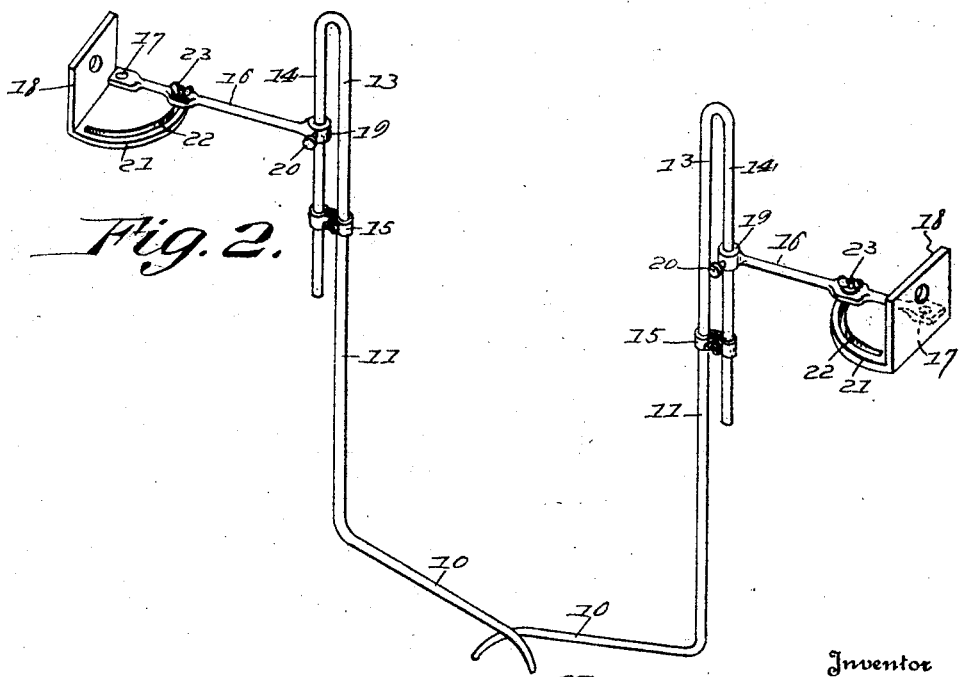
Inventor
Clarence Bishop,
By
Attorney Patented Mar. 2, 1926.

1,575,093

UNITED STATES PATENT OFFICE.

CLARENCE BISHOP, OF NEW FLORENCE, MISSOURI.

WEEDER FOR CULTIVATORS.

Application filed January 6, 1923. Serial No. 611,067.

*To all whom it may concern:*

Be it known that I, CLARENCE BISHOP, a citizen of the United States of America, residing at New Florence, in the county of Montgomery and State of Missouri, have invented a new and useful Improvement in Weeders for Cultivators, of which the following is a specification.

The object of the invention is to provide a simple and comparatively inexpensive device which may be used as an attachment for cultivators of the type used, for example, for hilling corn whereby the weeds which grow adjacent to and between the hills of corn may be turned or bent downward into positions parallel with the rows of corn stalks in advance of the hill blades or brackets so as to be covered and held in a depressed position by the soil thrown up against the stalks in the hilling thereof; and with this object in view the invention consists in a construction and arrangement of which a preferred embodiment is shown in the accompanying drawings, wherein:

Figure 1 is a view of a weeding attachment applied in the operative position to a cultivator.

Figure 2 is a detail view enlarged of a weeder.

Taking advantage of the fact that the weeds which are encountered in the corn field and which grow along the lines of and between the hills or stands of corn are of less stiffness or rigidity, or in other words, are more readily bendable than the corn stalks, the device embodying the invention consists essentially of weed folding arms 10 supported by shanks 11 at opposite sides of the plane of the row of corn to be treated, the arms 10 being disposed in a substantially horizontal position and directed inwardly toward the row of corn stalks where their extremities may be arranged in overlapping relation as shown in the drawing and preferably curved and deflected terminally so as to slide over the corn stalks without causing injury thereof. These arms are preferably so supported as to slide past the corn stalks but engage and carry the weeds forward as the machine progresses to the end that the weeds may be folded downward with their heads in the direction of the movement of the cultivator in advance of the disks or shovels 12 which serve to throw the soil inwardly toward the row of stalks for hilling and cultivating purposes. The weeds are thus caught by the soil and thrown toward the row of stalks and are held in the depressed position where they ultimately rot and serve as fertilizer.

In order that the folding arms may operate efficiently it is desirable that they be yieldingly or resiliently mounted so as to be deflected by the corn stalks sufficiently to allow the stalks to pass between the extremities of the arms and yet have sufficient stiffness to bend the weeds and it is also desirable in this connection to provide for a vertical adjustment of the arms so that they may operate sufficiently close to the surface of the soil to engage comparatively small weeds, and therefore in the illustrated embodiment of the invention the arms 10 and the stems 11 are formed of continuous rods which are extended and doubled upon themselves to form loops 13 and of which the outer portions 14 are connected with the inner sides by clips 15 serving to maintain the form of the loop. Thus the stems 11 are of looped form with one arm of the loop extended to form the inwardly directed folding arm at the lower extremity thereof.

With the other arm of the loop is engaged a supporting bracket 16 consisting in this instance of an arm pivoted at 17 upon a secured plate 18 and provided with a terminal sleeve 19 in which said arm of the loop is adjustable to vary the relation of the folding arm 10. The stem of the folding arm is secured at the desired adjustment with relation to the sleeve 19 by means of set screw 20, also the secured plate 18 is preferably provided with a quadrant 21 having a slot 22 for engagement by an adjusting bolt 23 to the end that the bracket 16 may be varied in position angularly with relation to the cultivator upon which it is mounted and may be locked in the desired adjustment. By means of the adjustment of the bracket arms 16 the extent of the terminals of the folding arms may be varied and the position of the vertical stems which carry said folding arms may be adjusted. Similarly the angular relation of the folding arms with relation to the bracket arms may be adjusted by turning the outer arm stem loops in the sleeves 19 and as above indicated the vertical adjustment of the folding arms may be effected through the same agency.

Having described the invention, what is claimed as new and useful is:

1. A weeding device for corn cultivating machines having weed folding arms laterally directed toward a row of corn stalks for bending the weeds in the direction of the progress of the cultivators in advance of the hilling shovels, said folding arms being provided with upright torsional stems and means for supporting the same from the cultivator frame.

2. A weeding device for corn cultivating machines having weed folding arms laterally directed toward a row of corn stalks for bending the weeds in the direction of the progress of the cultivators in advance of the hilling shovels, said folding arms having upright torsional stems and supporting brackets with which the stems are adjustably connected for varying the horizontal planes of the folding arms.

3. A weeding device for corn cultivating machines having weed folding arms laterally directed toward a row of corn stalks for bending the weeds in the direction of the progress of the cultivator in advance of the hilling shovels, the folding arms having upright looped stems, and supporting brackets having arms with which the terminal elements of the stems are adjustably connected.

4. A weeding device for corn cultivating machines having weed folding arms laterally directed toward a row of corn stalks for bending the weeds in the direction of the progress of the cultivator in advance of the hilling shovels, the folding arms having upright looped stems, and brackets having horizontal swinging bracket arms with which the terminal elements of said stems are adjustably connected and means for securing the bracket arms in their adjusted positions.

In testimony whereof he affixes his signature.

CLARENCE BISHOP.